United States Patent

Yamada

[19]

[11] Patent Number: 5,933,582
[45] Date of Patent: *Aug. 3, 1999

[54] PRINTING MANAGER METHOD AND SYSTEM FOR A COPYING MACHINE IN A NETWORK

[75] Inventor: Daisuke Yamada, Kawaguchi, Japan

[73] Assignee: Ricoh Company, Ltd., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/606,402

[22] Filed: Feb. 23, 1996

[30] Foreign Application Priority Data

Feb. 24, 1995 [JP] Japan ..................................... 7-060086

[51] Int. Cl.$^6$ ........................................................ G06F 15/00
[52] U.S. Cl. ............................ 395/114; 395/113; 395/112
[58] Field of Search .................................... 395/101, 114, 395/115, 116, 112, 117, 500, 340, 334, 335, 336, 326, 113, 835–839; 358/442, 448, 407, 468, 444, 401, 403; 370/449; 345/340, 334, 335, 336, 2, 326, 339, 346, 356; 399/1, 2, 8, 9–10

[56] References Cited

U.S. PATENT DOCUMENTS

| 4,947,345 | 8/1990 | Paradise et al. | 358/442 |
|---|---|---|---|
| 5,323,393 | 6/1994 | Barrett et al. | 370/449 |
| 5,396,345 | 3/1995 | Motoyama | 358/448 |
| 5,467,434 | 11/1995 | Hower, Jr. et al. | 395/114 |
| 5,699,494 | 12/1997 | Colbert et al. | 395/114 |
| 5,727,135 | 3/1998 | Webb et al. | 395/114 |

FOREIGN PATENT DOCUMENTS

| 0575168 | 12/1993 | European Pat. Off. . |
|---|---|---|
| 9411804 | 5/1994 | WIPO . |

*Primary Examiner*—Edward L. Coles
*Assistant Examiner*—Dov Popovici
*Attorney, Agent, or Firm*—Oblon, Spivak, McClelland, Maier & Neustadt, P.C.

[57] ABSTRACT

A print manager method and system for controlling printing of print jobs in a network includes at least one copying machine, at least one terminal, and an object request broker. In particular, the copying machine has a CPU for controlling the copying machine, a memory for storing control programs and the copying machine's appearance data, and a communication device for transferring the data. The appearance data includes a picture of the appearance of the copying machine, a picture of an operation panel of the copying machine, and specifications or status information of each device of the copying machine. The terminal is connected to the copying machine, and has a display device for displaying the data from the copying machine, a pointing device for pointing to a part of the displayed image on the display device, a communication device for transferring coordinate numerical data corresponding to the part of the displayed image pointed to by the pointing device. The object request broker is connected to the copying machine and the terminal, under a CPU control, and includes a memory for storing control programs for controlling the object broker, a service controller for controlling the interface between the copying machine and the terminal and for selecting the best available copying machine for that terminal.

17 Claims, 16 Drawing Sheets

| VP | PN |
|---|---|
| ID \| TYPE | POSITION |
| COOR(X,Y) | (X,Y) |
| VP | PN |
| ID \| TYPE | POSITION |
| COOR(X,Y) | (X,Y) |
| ⋮ | ⋮ |
| X SIZE | Y SIZE |
| APPEARANCE DATA ||
| VP | PN |
| ID \| TYPE | POSITION |
| COOR(X,Y) | (X,Y) |
| VP | PN |
| ID \| TYPE | POSITION |
| COOR(X,Y) | (X,Y) |
|  ||
| X SIZE | Y SIZE |
| APPEARANCE DATA ||

FIG.7

| DATA LENGTH ||
|---|---|
| ID \| TYPE | POSITION |
| COM | PARA |
| COM | PARA |
| VP | PN |
| ID \| TYPE | POSITION |
| COM | PARA |
| ⋮ | ⋮ |
| COM | PARA |

FIG.8

| NUMBERS OF DEVICE ||
|---|---|
| ID \| TYPE | POSITION |
| ID \| TYPE | POSITION |
| ⋮ | ⋮ |
| ID \| TYPE | POSITION |

FIG.9

PRINTING MANAGER METHOD AND SYSTEM FOR A COPYING MACHINE IN A NETWORK

BACKGROUND OF THE INVENTION

1. Field of the Invention

This invention relates to a print manager method and system for copying machines in a network with improved communication functions, and more particularly, to the remote control of such copying machines.

2. Discussion of Background

A network system consisting of a number of workstations or personal computers and a number of digital multi-function copying machines (i.e., copying machines which typically combine a copier function, a facsimile function, a printer function, and a scanner function) is known in the art.

Users print out documents produced at their local workstations or personal computers on copying machines connected to the network. When a user wants to print out documents, he/she must walk down to the copying machine and change the mode on an operation panel to "PRINTING MODE." Because the multi-function copying machine not only has a printer function, but also has other functions as explained above, it is necessary to first change the mode. Next, the user sets up or programs other parameters of the machine. For example, the user may have to specify the size of the paper trays included in the machine, how many pages the tray holds, the status of a sorting device, and so on. Then the user has to select the best available machine that the user wants, and the user also has to check whether or not the machine is operational. Finally, the user goes back to his workstation and prints the document or documents. After the documents have printed, the user must walk down to the copying machine to pick up the documents and to change the mode to the original mode of operation. This process takes much time, especially on networks which cover a wide area with each workstation located at a great distance from the copying machine.

SUMMARY OF THE INVENTION

Accordingly, one object of this invention is to provide a novel print manager method and system for copying machines in a network capable of remotely programming the copying machines from the workstations.

It is an another object of the present invention to provide a print manager method and system for copying machines in a network capable of remotely programming the copying machine from a workstation without requiring special hardware or software.

It is still another object of the present invention to provide a print manager method and system for copying machines in a network capable of remotely programming the copying machine from various types of workstations without requiring special hardware or software.

In order to achieve the above objectives, briefly, the present invention is a print manager system for copying machines in a network environment which includes at least one copying machine, at least one terminal, and an object request broker. In particular, the copying machine has a CPU for controlling the copying machine, a memory for storing control programs and the copying machine appearance information and a communication device for transferring the data. The appearance information includes a picture of the appearance of the copying machine, a picture of an operation panel of the copying machine, and specifications or status information of each copying machine. The terminal is connected to the copying machine, and has a display device for displaying the data from the copying machine, a pointing device for pointing to a part of the images displayed by the display device, a communication device for transferring coordinate numerical data corresponding to the part of the displayed images pointed to by the pointing device. The object request broker is connected to the copying machine and the terminal, is under CPU control, has a memory for storing control programs for controlling the object broker, has a service controller for controlling the interface between the copying machine and the terminal, and selects the best available copying machine for that terminal.

BRIEF DESCRIPTION OF THE DRAWINGS

A more complete appreciation of the invention and many of the attendant advantages thereof will be readily obtained as the same becomes better understood by reference to the following detailed descriptions when considered in connection with the accompanying drawings, wherein:

FIG. 7 is an illustration of the data structure of the appearance information written in a raster data format;

FIG. 8 is an illustration of the data structure of the appearance information written in a graphics command format;

FIG. 9 is an illustration of the data structure of the appearance information written in a logical device information format;

DESCRIPTION OF THE PREFERRED EMBODIMENTS

Figure 1:
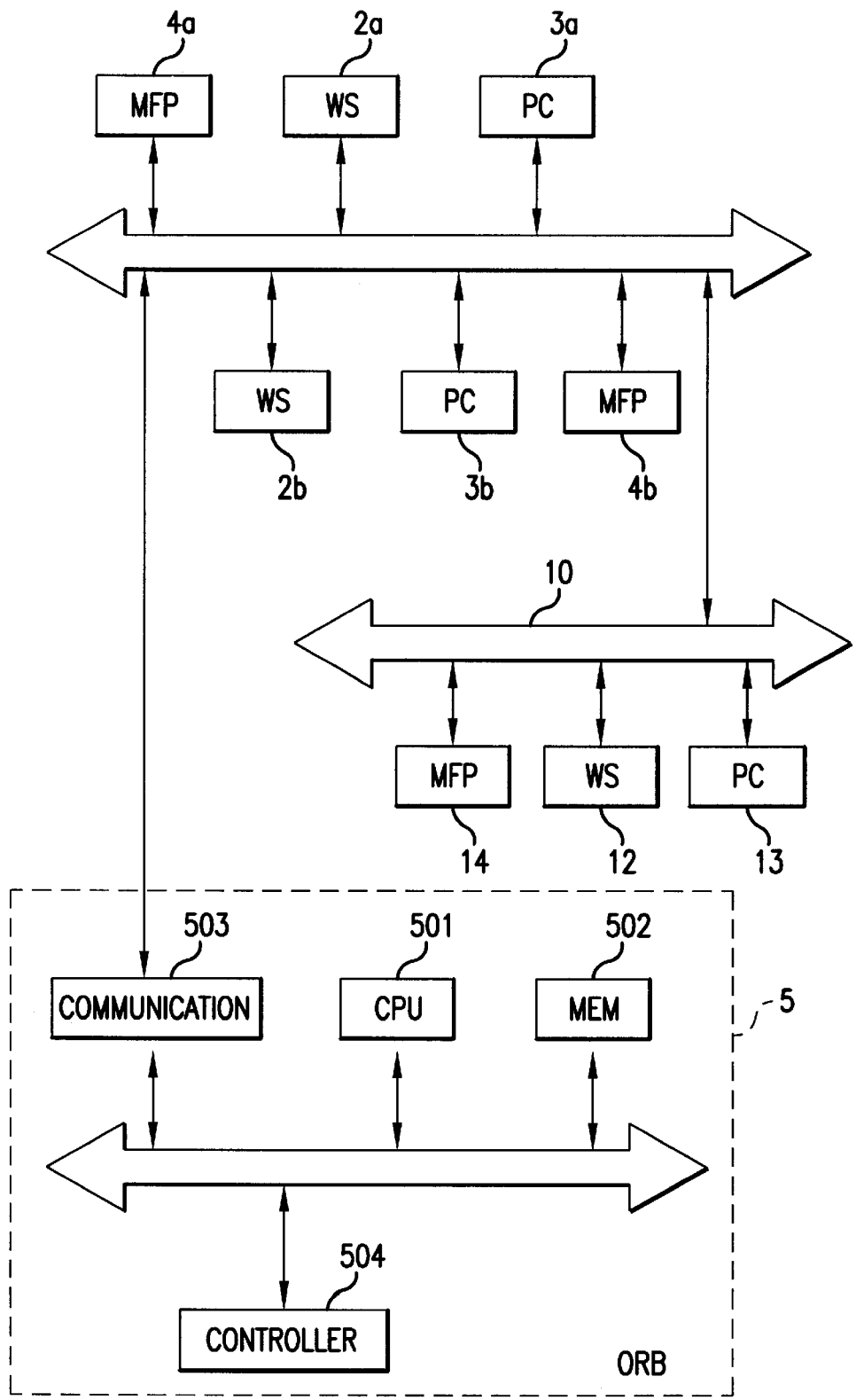
FIG. 1 is a schematic block diagram of the network system of the present invention.

Referring now to the drawings, wherein like reference numerals designate identical or corresponding parts throughout the several views, and more particularly to FIG. 1 thereof, is an illustration showing the system structure of the first embodiment of the print manager system according to the present invention. In this system, there are two network systems 1 and 10 which are connected to each other. The first network system, network system 1, contains a number of workstations 2a and 2b (hereinafter referred to as simply "workstations 2"), a number of personal computers 3a and 3b (hereinafter referred to as simply "personal computers 3"), and a number of digital multi-function copying machines 4a and 4b (hereinafter referred to as simply "copying machines 4"). The workstations and personal computers are referred to as terminals or clients in the network environment. The multi-function copying machines are referred to as servers in the network environment. The second network system, network system 10, also contains a workstation 12, a personal computer 13, and a digital multi-function copying machine 14. Both of the two network systems are connected to an object request broker 5.

Briefly, object request broker 5 ("broker 5") controls the workstations, personal computers, and copying machines which are connected to the first and second network systems. Broker 5 includes a CPU 501, a memory 502, a communication controller 503, and a service controller 504. CPU 501 controls the entire system of broker 5. Many kinds of programs and data for controlling broker 5 may be installed in memory 502. Service controller 504 controls the interface between the terminals and the copying machines. When service controller 504 receives a request from a terminal, controller 504 inquires from each copying machine whether or not the request can be implemented by that copying machine. After receiving an answer from each copying machine, controller 504 selects the best available copying machine for that terminal. The details as to the function of broker 5 will be explained later.

Figure 2:
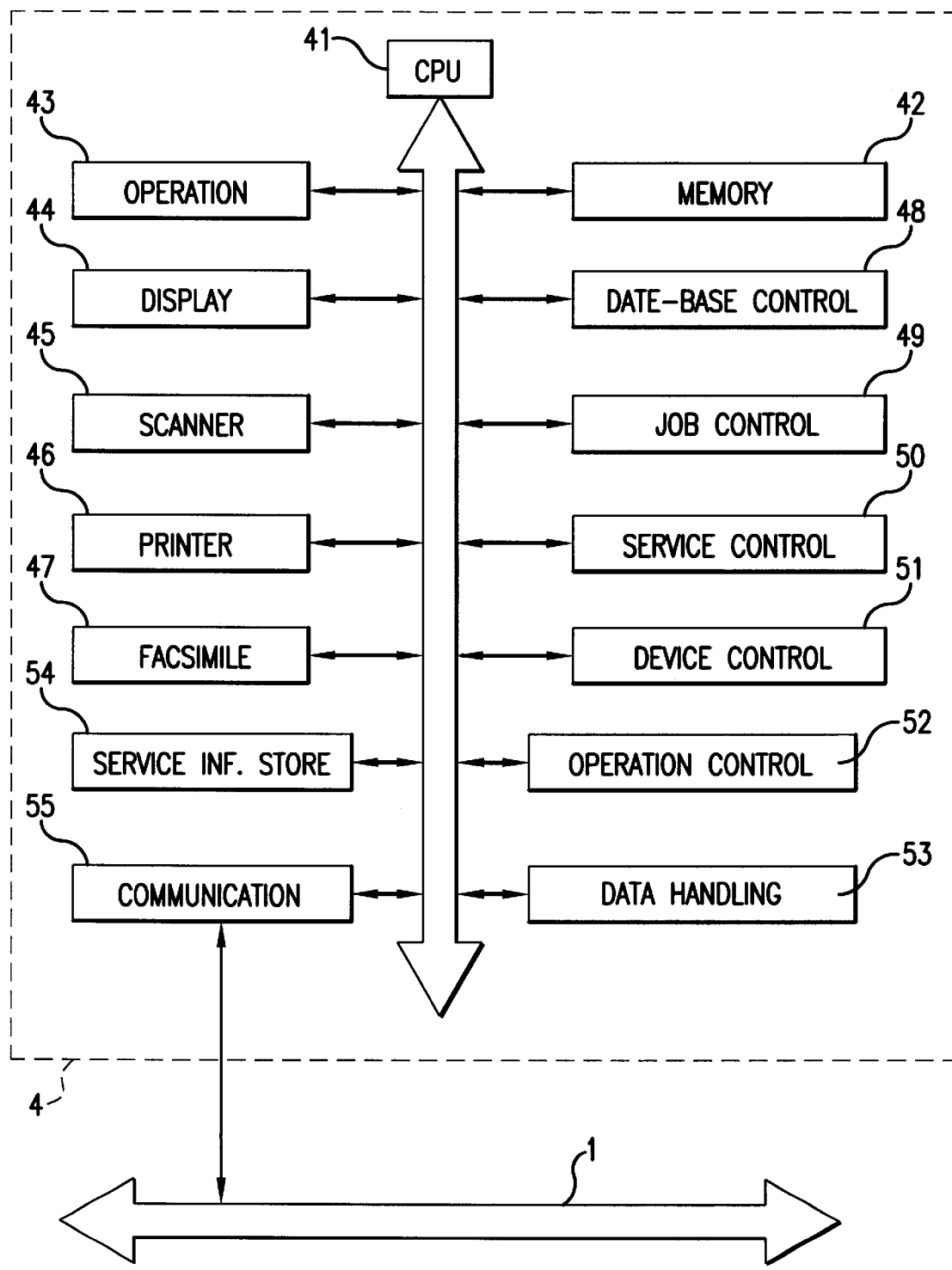
FIG. 2 is a schematic block diagram of a multi-function copying machine of the present invention.

Each multi-function copying machine 4 may combine a copier function, a facsimile function, a printer function, and a scanner function, or some or all of these functions. As shown in FIG. 2, the multi-function copying machine includes CPU 41, memory 42, operation device 43, display device 44, scanner device 45, printer device 46, facsimile device 47, data-base controller 48, job controller 49, service controller 50, device controller 51, operation controller 52, data handling device 53, service information storing device 54, and communication controller 55.

CPU 41 controls the entire multi-function copying machine. Memory 42 stores control programs and data for various copying machine configurations and implementations. Data-base controller 48 controls certain data, such as font data, form data, scanned image data, data from the facsimile device, and data from an operation. Controller 48 also accesses and stores the various types of data. When a job requested by a user of a terminal comprises a plurality of implementations of services, job controller 49 controls these implementations one by one. Service controller 50 controls implementations, completion reports, and controls status for a copy service, a facsimile service, a printer service, a scanner service, and so on. The device controller 51 provides control information, accesses information and control status of the above mentioned devices of the copying machine. Data handling device 53 stores data from the terminals. Service information storing device 54 stores copying machine information including appearance information of the copying machine and operation panel, and specifications of each device of the copying machine, and so on. Operation controller 52 stores input information from operation device 43, and outputs data, including data from data handling device 53, to display device 44.

Figure 3:
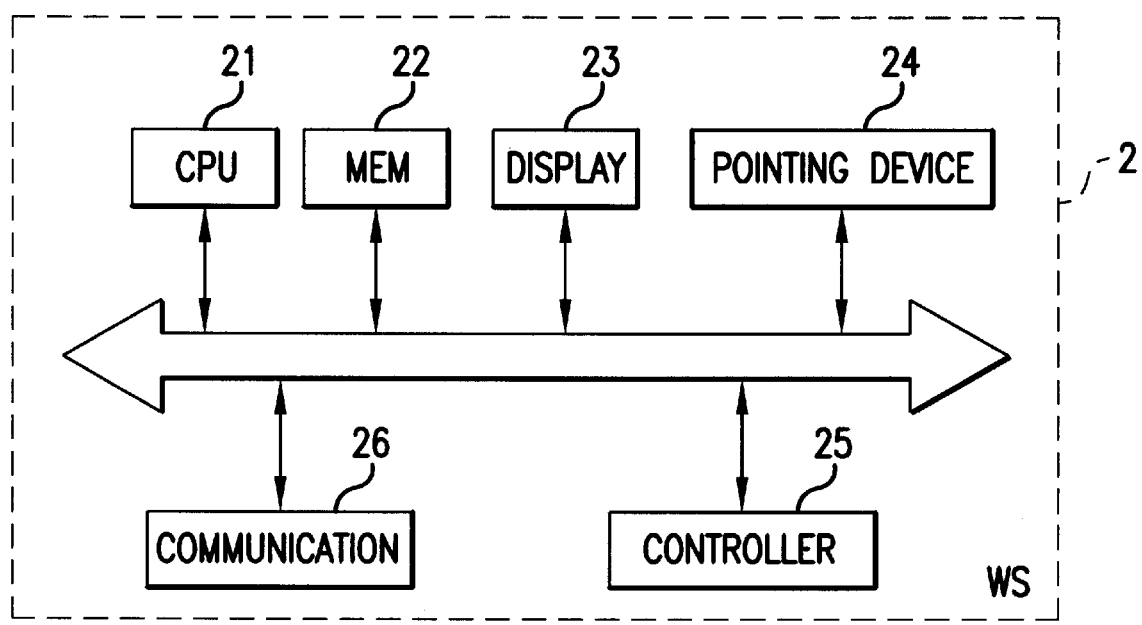
FIG. 3 is a schematic block diagram of a workstation of the present invention.

As shown in FIG. 3, the terminal includes CPU 21 which controls the whole device, memory 22 which stores control programs and data for various implementations, display device 23, such as a CRT or an LCD for displaying messages to the user, pointing device 24 such as a mouse, display controller 25 which controls display device 23, and communication device 26. Each terminal, which may be referred to as a client, is operated by a user. As discussed previously, each terminal is provided with a display device for interfacing between the user and the system. Generally, the display device has a sophisticated user interface so that the user can input instructions for various functions incorporated in the system.

There are three types of the print manager systems, depending on the type of network to which clients and servers are connected. The first type is a network which comprises one client and one server. The second type is a network which comprises multi-clients and one server. The third type is a network which comprises multi-clients and multi-servers. The second and third types of client/server networks will be explained in detail hereinafter.

Figure 4:
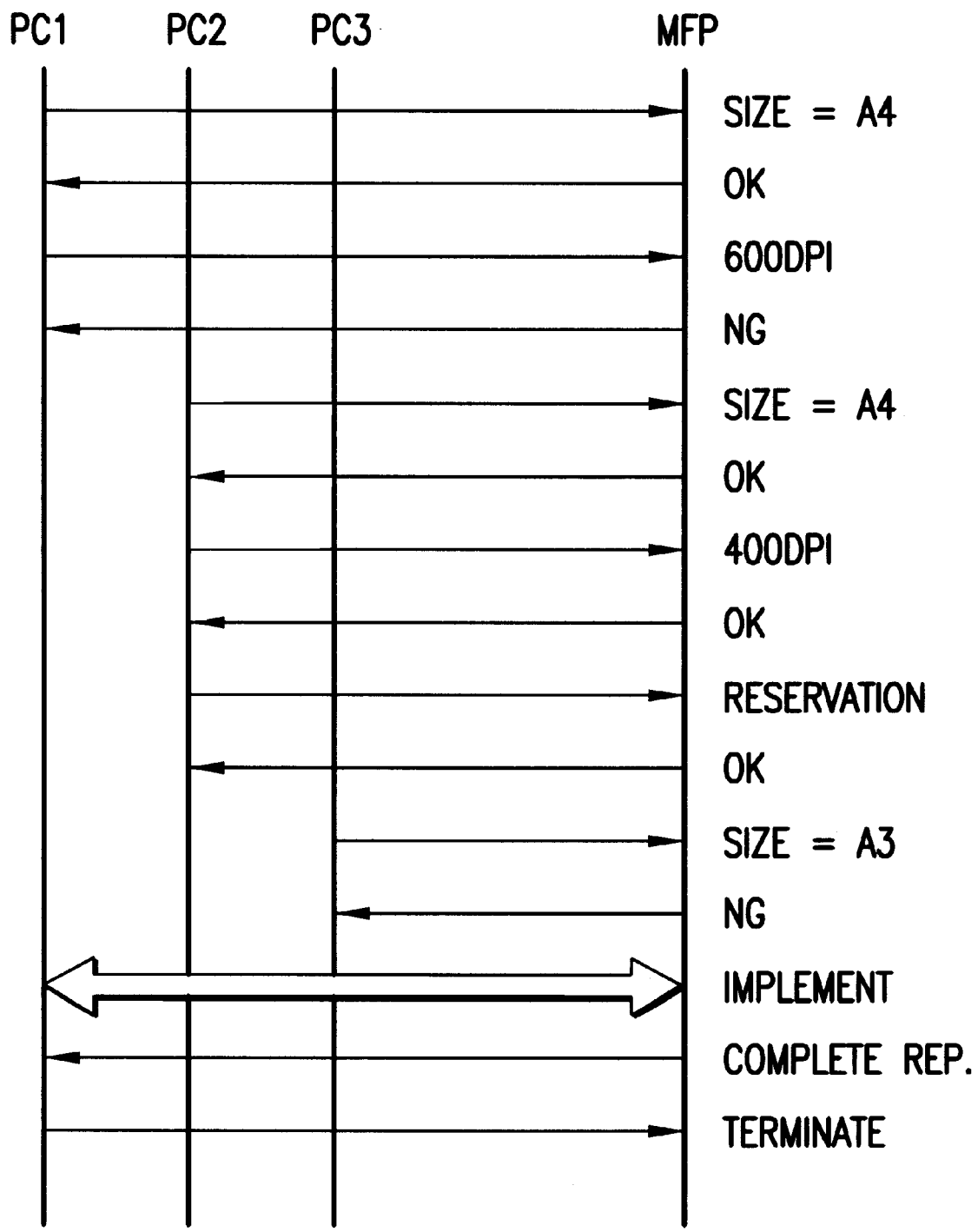
FIG. 4 is a communication sequence of a protocol between the three workstations and a multi-function copying machine according to an embodiment of the present invention.

FIG. 4 shows a communication sequence between three clients PC1, PC2, PC3 and a server MFP to determine whether or not the server has the capability to satisfy a given request from the clients. Server MFP has its own capabilities, for example, "print paper size" and "optical resolution," which have been registered. In this embodiment the registered specification for server MFP are "print paper size =A4,B5,A5,A6,B6,A7" and "optical resolution =400 dpi."

In the above situation, client PC1 requests "A4 and 600 dpi," client PC2 requests "A4 and 400 dpi," and client PC3 requests "A3 and 600 dpi." When a "print paper size =A4" request is transferred from client PC1 to the server, the server returns an answer of "OK" to client PC1. But for the "optical resolution =600 dpi," request the server returns an answer of "NG (no good)." On the other hand, as to client PC2, the server returns "OK" for both requests, and the client transfers a reservation request to use the server. If the server accepts the reservation, it transfers an answer of "OK" and client PC2 is connected to the sever (i.e., on-line condition). As to client PC3, the server returns an answer of "NG" for both requests. The print job is transferred from client PC2 to the server, and the data is printed out on the server. After completing the print job the server transfers a completion report to client PC2 and client PC2 terminates the connection to the server. The details of printing will be explained later.

Figure 5:
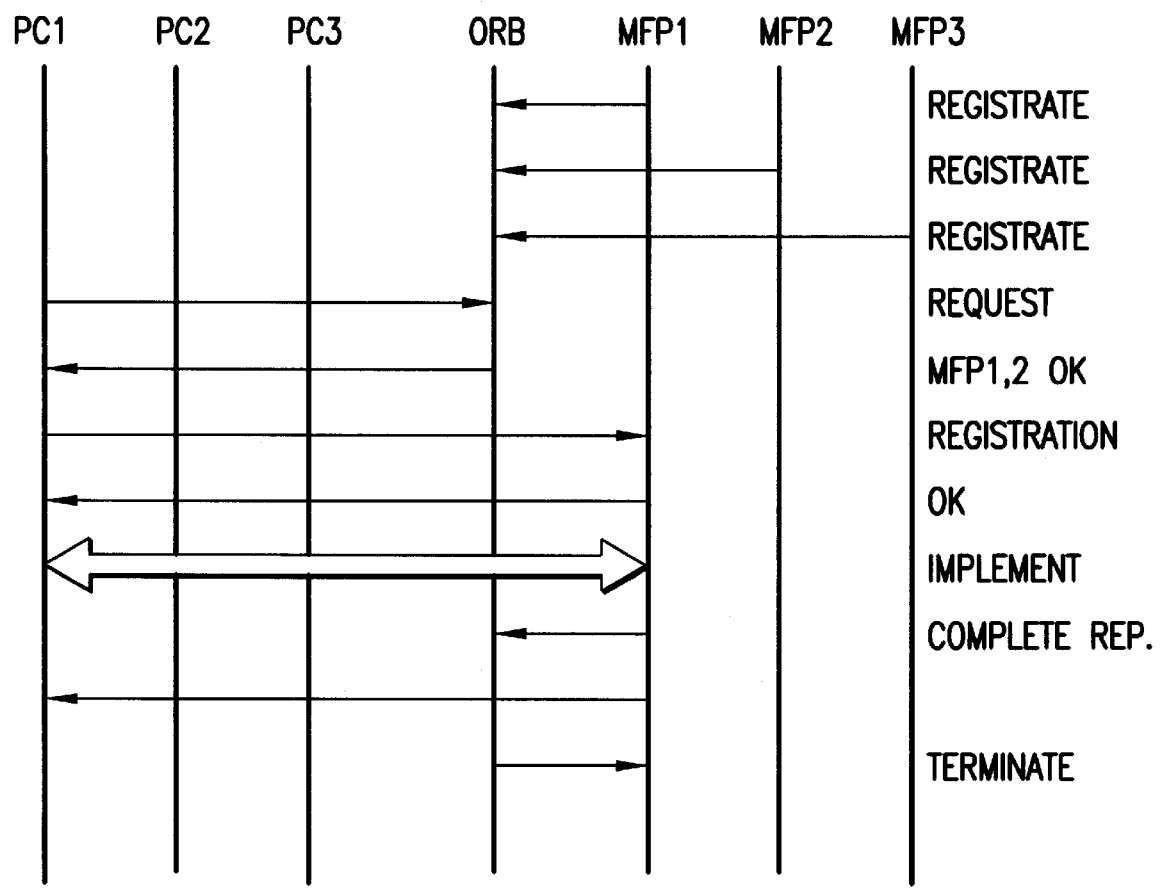
FIG. 5 is a communication sequence of a protocol between the three workstations, three multi-function copying machines, and an object request broker according to an embodiment of the present invention.

FIG. 5 shows a communication sequence among three clients PC1, PC2, PC3, three servers MFP1, MFP2, MFP3, and an object request broker. The object request broker finds the best available server to satisfy a given request from one of the clients. The servers have various capabilities, for example, "print paper size" and "optical resolution," which have been registered with the object request broker. In this second embodiment, the registered specifications for the first server are "print paper size =A3,A4,B5,A5,A6,B6,A7'" and "optical resolution =400 dpi," the registered specifications for the second server are "print paper size =A3,A4,B5,A5, A6,B6,A7" and "optical resolution 600 dpi," and the registered specifications for the third server are "print paper size=A4,B5,A5,B6,A6,A7" and "optical resolution =600 dpi." In the above situation, client PC1 requests "A3 and 400 dpi," and the broker answers that "the servers MFP1 and MFP2 are available to satisfy your request." Next client PC1 selects server MFP1, since server MFP1 is the closest. Then client PC1 transfers a reservation request to use server MFP1. If server MFP1 accepts the reservation, it transfers an answer of "OK" and client PC1 is connected to server MFP1 (i.e., on-line condition). The print job is transferred from client PC1 to server MFP1, and the data is printed out on server MFP1. After the print job is completed on the server, the server transfers a completion report to client PC1 and client PC1 terminates the connection to server MFP1. The details of printing will be explained later.

After the client or terminal is connected to the best available server or copying machine to satisfy a given request, it starts to implement the printing service between the client and the server.

Figure 6:
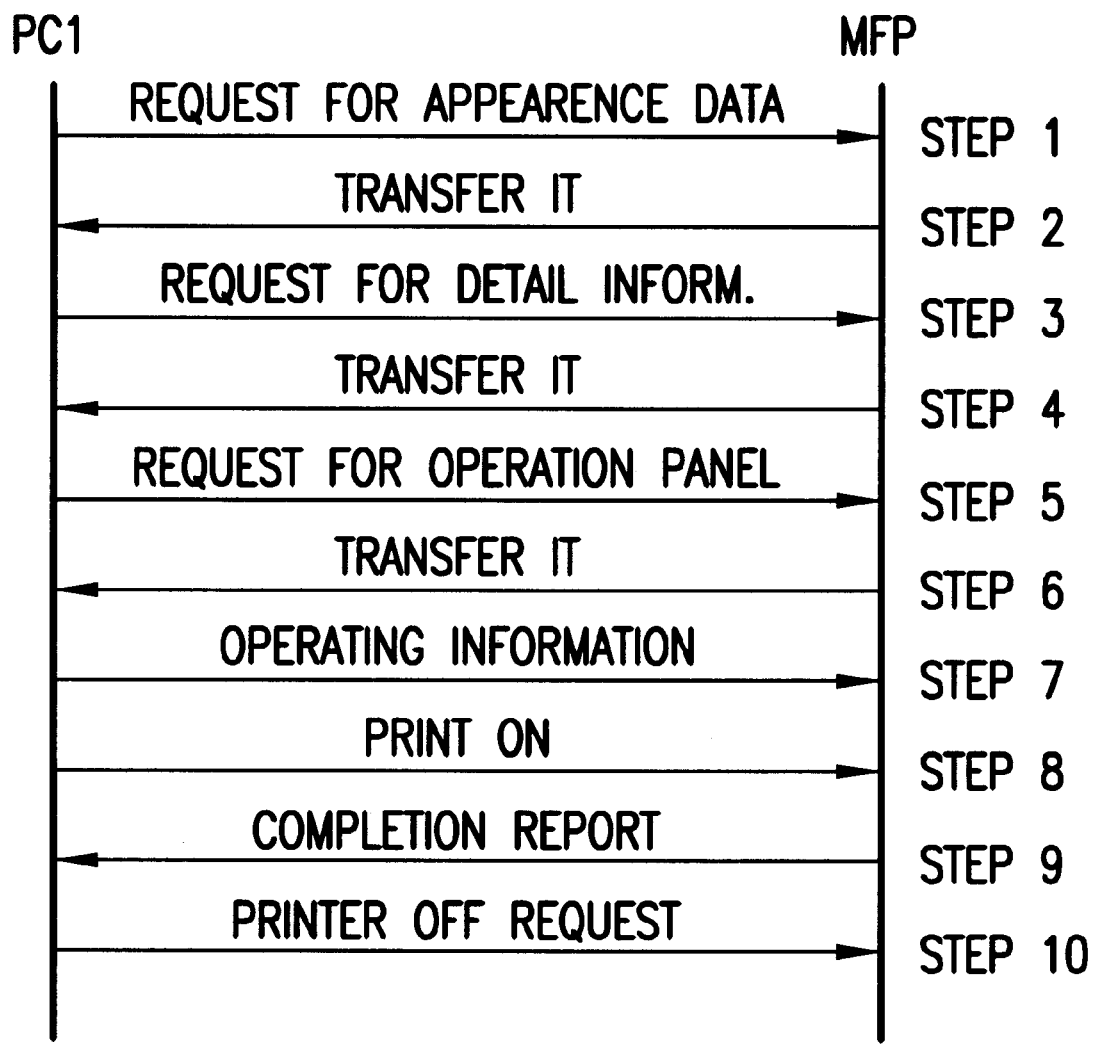
FIG. 6 is a communication sequence of a protocol between the workstation and the copying machine according the embodiment of the present invention.

As shown in FIG. 6, an outline of the implementation will be explained hereinafter step by step. The client requests the server to transmit the appearance information data (step 1). The server transfers the data to the client (step 2). A picture of the appearance data is displayed at the display device 23 of the client. The user can recognize the structure of the server or copying machine from the displayed picture, for example, the user can recognize that there are three paper trays in the picture. When the user wants to know the detailed information for each device of the copying machine, the user points to the device in the picture and requests the detailed information from the server (step 3). In this embodiment, the user requests the detailed information about the paper tray. After the server receives the request, the server gets the detailed information and transfers it to the client (step 4). If the user wants to know about another device of the copying machine, he/she repeats step 3 and 4. After the user has obtained the necessary detailed information which he/she wants to know, the user transfers a request for transmitting a picture of an operation panel (step 5). The server transfers the picture to the client (step 6). The picture of the operation panel is displayed in the display of the client. The user points to the picture to operate the server and the information pointed to is transferred to the server (step 7). The server recognizes the information pointed to and initializes itself according to the information. The user points to a picture of the "PRINT ON" button and the command is transferred to the server (step 8). After the server receives the command, the server starts to print. When the server has finished the print job, the server transfers a "print finish" signal to the client (step 9). The client next transfers the command "turn off the PRINT ON button" to the server (step 10). In this way, the user can control the copying machine remotely at the terminal.

The appearance information for each device within each server MFP is stored in advance in the service information storing device 54 of every server. When a server MFP is initialized, the appearance information may be stored in a raster data format, a graphics command format, or a device information format FIG. 7 is an illustration of the data structure for the appearance information written in the raster data format. This data comprises two types of appearance information (front view data and rear view data,) "VP" means "view point," such as front view, rear view, right side view, left side view, and so on. "PN" means "part number" or device number which corresponds to the number of the device to be shown in the appearance picture. "ID" means "device ID" or identification number for each device, such as, a printing engine, a front cover, a paper tray, a discharged paper tray, an ADF, and so on. "TYPE" means the type of device, for example, a paper tray has "500 page paper tray," or "250 page paper tray," or "paper reversing tray," and so on. "POSITION" means the position of the device, for example, a paper tray has "a first step position tray," "a second step position tray," and so on. "COOR" means "coordinates" of the device which shows two sets of coordinates to indicate an uppermost left position and a lowermost right position, so that the location of the device within the appearance picture will be known. Each device to be shown in the appearance picture has an "ID," "TYPE," "POSITION," and "COOR" attribute. "X SIZE" corresponds to the X-axis length of the display, and "Y SIZE" corresponds to the Y-axis length of the display. "Appearance Data" designates the appearance of the display, for example, a front view.

FIG. 8 is an illustration of the data structure for the appearance information written in the graphics command format. "COM" stands for "commands" and is the command used to draw a figure of the appearance of the device. "PARA" stands for the parameters of the command. The explanation of the same items which have already been explained with reference to the preceding Figures will be omitted.

FIG. 9 is an illustration of the data structure of the appearance information written in logical device information format. Each "TYPE" has its appearance picture data stored in another part of the memory.

Figure 10:
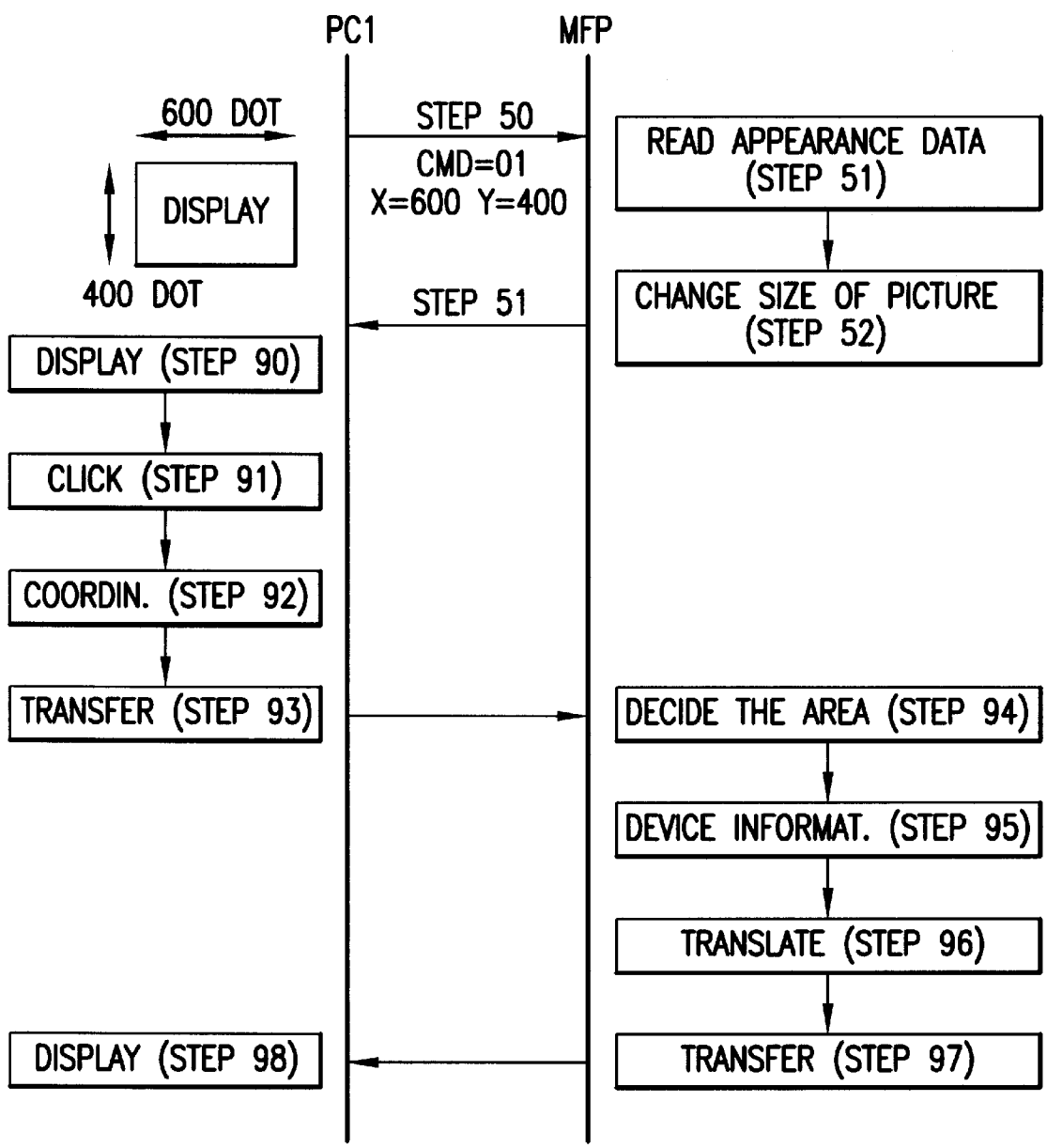
FIG. 10 is a detailed communication sequence of a protocol between the workstation and the copying machine with regard to steps 1 to 4 in FIG. 6, in which the raster data format is used.

FIG. 10 shows the details of the communication sequence between the client and server with regard to steps 1 to 4 in FIG. 6, in which raster data is used.

The client requests a picture of the appearance information from the server with a command code for the data style and the client's display size, for example, CMD=01, X=400 dot and Y=600 dot (step 50). "CMD=01" means that the client request the picture data in the raster format. The operation controller 52 of the server reads the appearance information from the service information storing device 54 (step 51), and the size (X size and Y size) of the picture of the appearance information is changed according to the client's display size (step 52). The information is transferred to the client via the communication controller 55 (step 53). The information is stored in the memory 22 via display controller 25 to display it at the display device 23 (step 90). The user can recognize the structure of the server or copying machine from the displayed picture of the appearance information.

Figure 13A:
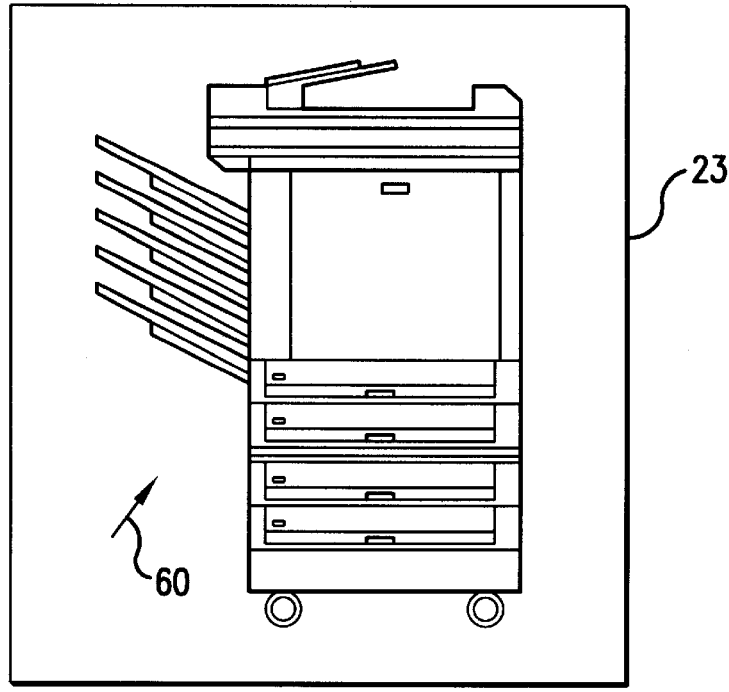
FIGS. 13a and 13b are illustrations of screen images which may be displayed by the workstation.

FIG. 13a is an illustration of a screen image, which may be displayed at the terminals. The screen image includes the appearance information and pointer 60 which moves in response to mouse movements by the user. The user can move pointer 60 to any position within the screen image.

When the user wants to know detailed information for a given device, the user moves pointer 60 to the device which he/she wants to know more details about and clicks the mouse on the device in the picture (step 91). Then the client determines the coordinates (x, y) of the device which pointer 60 pointed to (step 92). The coordinates (x, y) are transferred from the client to the server via the communication device 26 (step 93). After the server receives the coordinates, operation controller 52 of the server gets data such as "ID", "TYPE", "POSITION" and stores it in the data structure of FIG. 7, which corresponds to the coordinate (x, y) (step 94), and the device information (step 95). The data for the message to be displayed is translated. For example, the message could be "the second paper tray, A4 size paper, 500 papers, READY" (step 96). The server transfers the message to the client via the communication controller 55 (step 97). After the client receives the message, it is displayed in the display device (step 98).

Figure 13B:
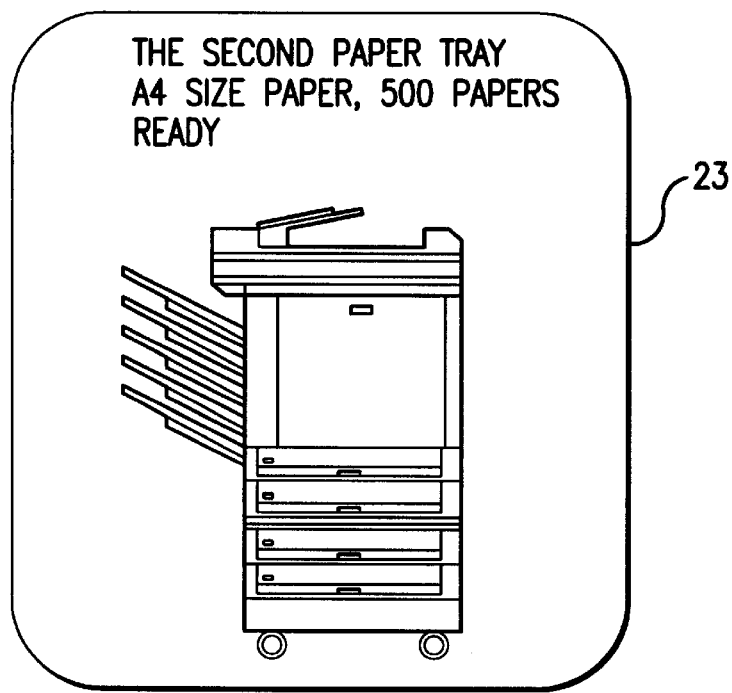

FIG. 13b is an illustration of a screen image including the message which is displayed by the terminal. From this image, the user can determine the specifications of the device which he/she inquired about.

Figure 11:
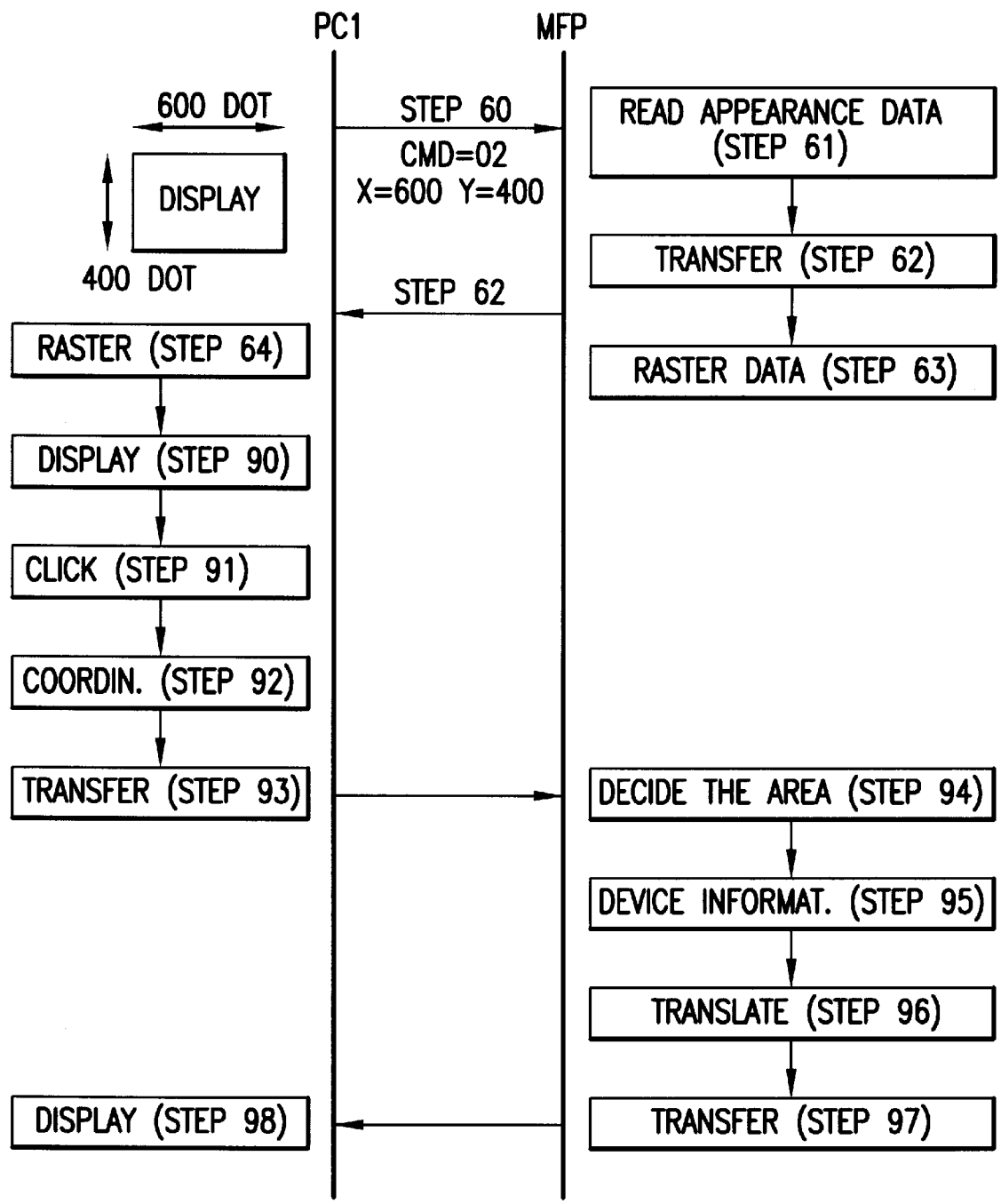
FIG. 11 is a detailed communication sequence of a protocol between the workstation and the copying machine with regard to steps 1 to 4 in FIG. 6, in which the graphic command format is used.

FIG. 11 shows the communication sequence in detail between the client and server with regard to steps 1 to 4 in FIG. 6, in which the graphic command format is used. In FIG. 11, steps that serve basically the same purpose as the steps shown in FIG. 10 are given the same reference numerals, and descriptions thereof will be omitted.

The client requests a picture of the appearance information from the server with a command code for the data style and the client's display size, for example, CMD=02, X=400 dot and Y=600 dot(step 60). "CMD=02" means that the client is requesting the picture data in a graphic command data format. The operation controller 52 of the server reads the appearance information from the service information storing device 54 (step 61), and the size (X size and Y size) of the picture of the appearance information is changed according to the client's display size. Next the information is transferred to the client via communication controller 55 (step 62). In both the server and the client, the graphic commands is translated to raster data (step 63 & 64). Steps 90 though step 98 in FIG. 11 are given the same reference numerals as in FIG. 10 and an explanation of these steps is omitted since these steps perform the same function.

Figure 12:
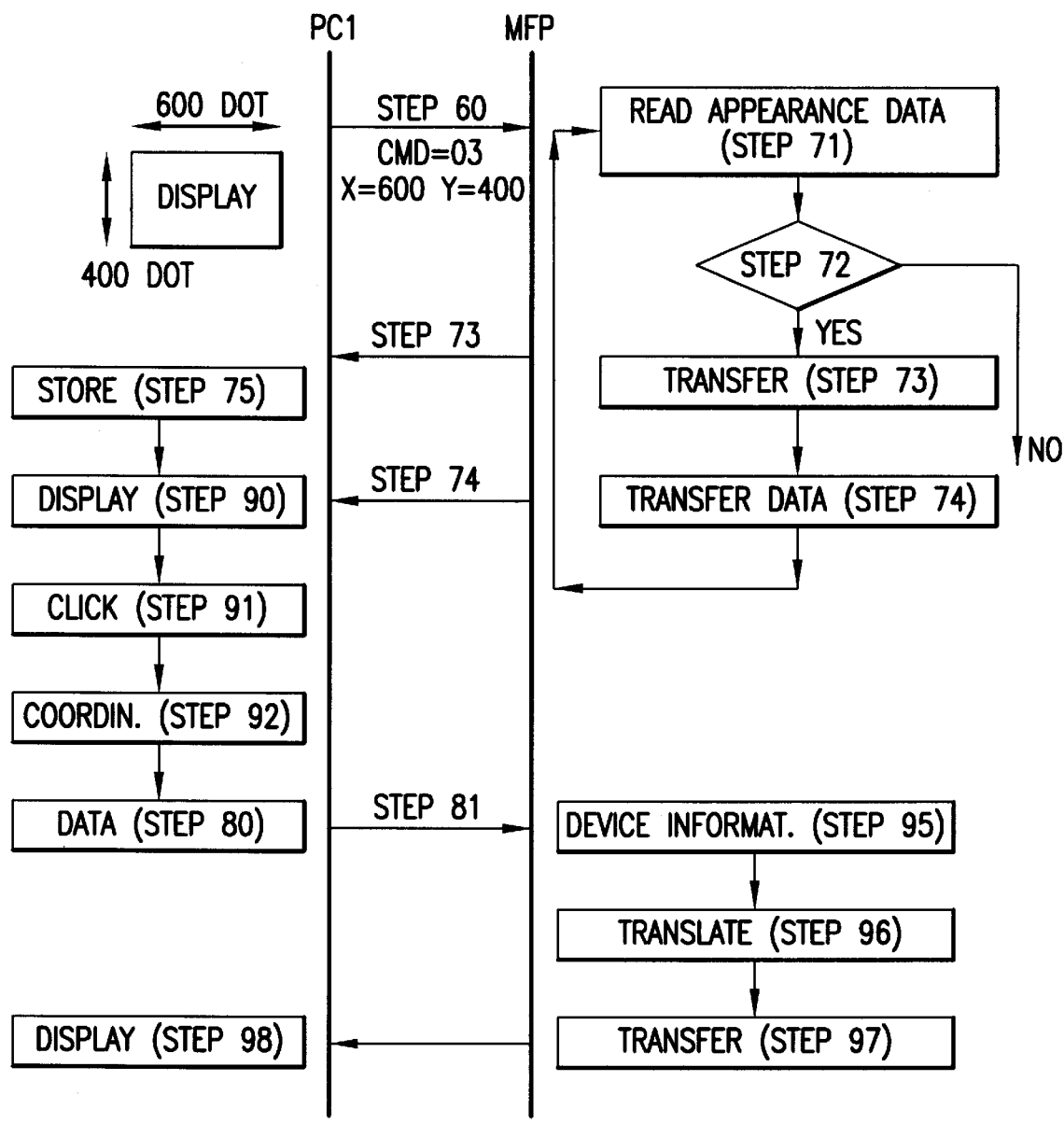
FIG. 12 is a detailed communication sequence of a protocol between the workstation and the copying machine with regard to steps 1 to 4 in FIG. 6, in which the device information command format is used.

FIG. 12 shows the details of the communication sequence between the client and server with regard to steps 1 to 4 in FIG. 6, in which the device information command is used. In FIG. 12, steps that perform the same function as the steps shown in FIG. 10 are given the same reference numerals, and descriptions thereof will be omitted. The client requests the picture of the appearance information from the server with a command code for data style and the client's display size, for example, CMD=03, X=400 dot and Y=600 dot(step 70). "CMD=03" means that the client is requesting the picture data in device information format. Operation controller 52 of the server reads the appearance information from the service information storing device 54 (step 71). If there is data, then it goes to the next step (step 72). Information, such as, "ID", "TYPE", and "POSITION" is transferred to the client via communication controller 55 (step 73). The server sends the displayed picture's data according to the device information command (step 74), and transfers it to the client (step 74). The client stores the information. Steps 90 through 98 in FIG. 12 are given the same reference numerals as in FIG. 10 and an explanation of these steps is omitted since these steps perform the same function.

Figure 14:
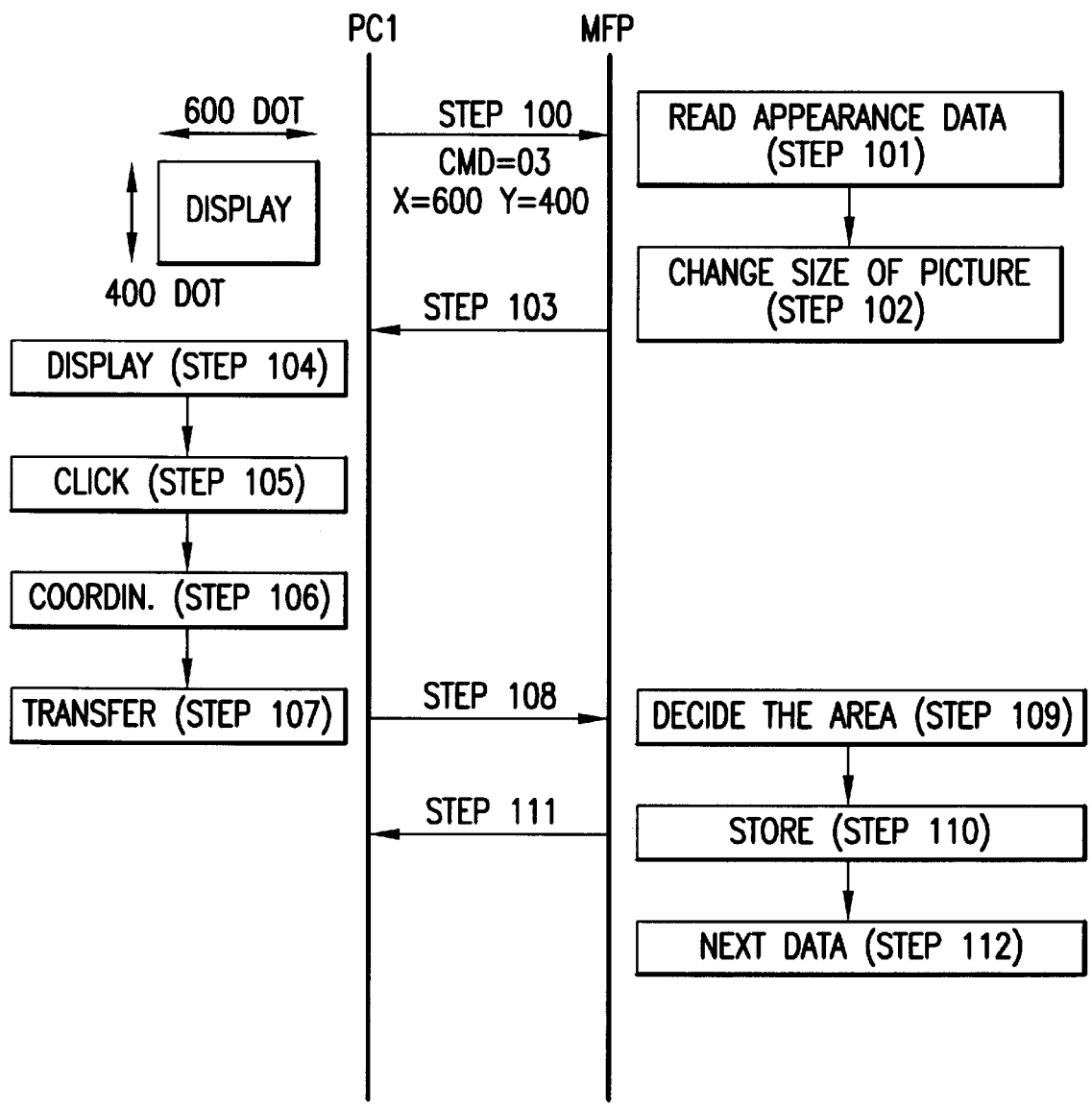
FIG. 14 is a detailed communication sequence of a protocol between the workstation and the copying machine with regard to steps 5 to 7 in FIG. 6, in which both of the raster data format and the graphic commands format are used.

FIG. 14 shows the details of the communication sequence between the client and server with regard to steps 5 to 7 in FIG. 6, in which both the raster and graphic formats are used.

Figure 15:
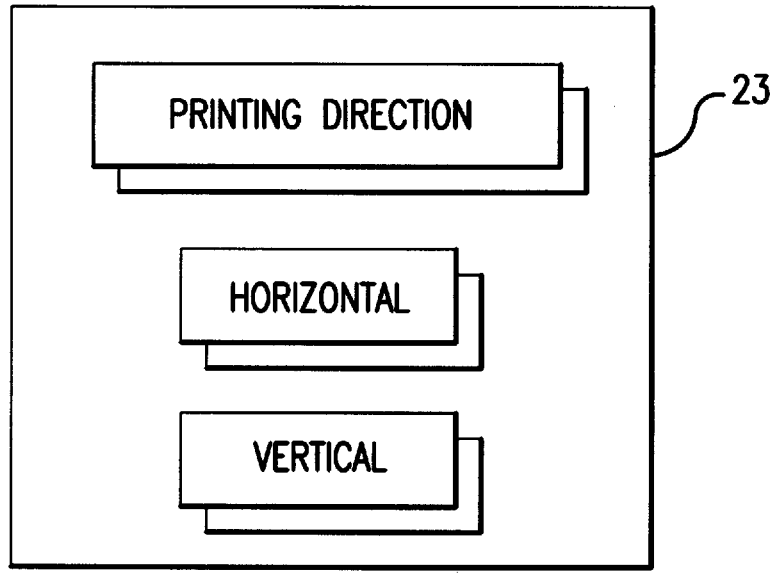
FIG. 15 is one example of a screen image, which may be displayed by the workstation.

The client requests the operation panel information from the server with a command code and client's display size, for example, CMD=03, X=400 dot and Y=600 dot (step 100). Operation controller 52 of the server reads the information from service information storing device 54 (step 101), and the size (X size and Y size) of the picture appearance information is changed according to the client's display size (step 102). The information is transferred to the client via the communication controller 55 (step 103). The information is stored in memory 22 via display controller 25 and is sent to display device 23 (step 104). The user can recognize the structure of the server or copying machine in the displayed picture of the appearance information. FIG. 15 is one example of a screen image, which may be displayed by the terminals. The screen image includes panel information for setting-up the server, for example, "printing direction ; horizontal direction of a paper or vertical direction of a paper," and pointer 60 which moves in response to mouse movements by the user. The user moves pointer 60 to any position within the screen image and clicks the mouse on the object the user wants to select, for example, "horizontal" (step 105). In response, the client gets the coordinates (x, y) of the point corresponding to pointer 60 (step 106). The coordinates (x, Y) are transferred from the client to the server the communication device 26 (step 108). After the server receives the coordinates, operation controller 52 determines the object the coordinates point to (Step 109) and stores it (step 110). In this example, controller 52 stores "horizontal". The server transfers an "OK" signal to the client (step 111). The above steps are repeated until all of the panel information is transferred to the client.

Figure 16:
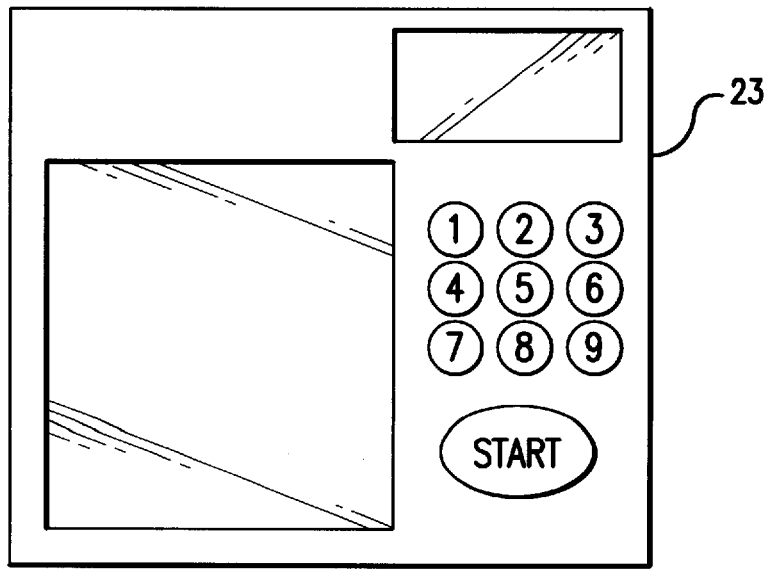
FIG. 16 is another example of a screen image, which may be displayed by the workstation.
Figure 17:
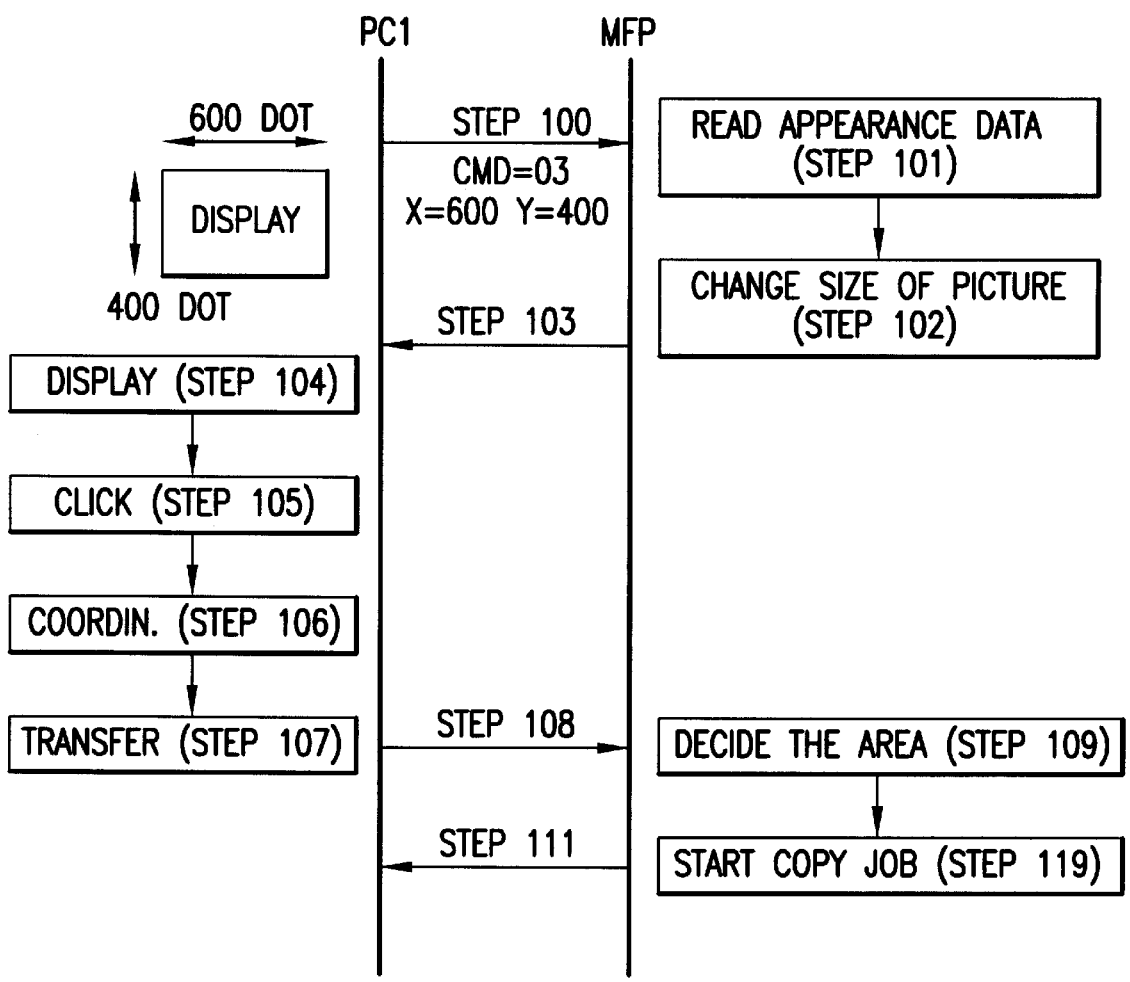
FIG. 17 is a detailed communication sequence of a protocol between the workstation and the copying machine with regard to steps 8 to 9 in FIG. 6.

FIG. 17 shows the communication sequence in detail between the client and server with regard to steps 8 to 9 in FIG. 6. After all the panel information is rendered, including the "START" button shown in FIG. 16, the information is transferred from the server to the client. Steps in FIG. 17 that serve the same purpose as steps shown in FIG. 14 are given the same reference numerals, and descriptions thereof will be omitted. When the server receives the coordinates which correspond to the "START" button, the server starts to implement a copying job (step 119).

Figure 18:
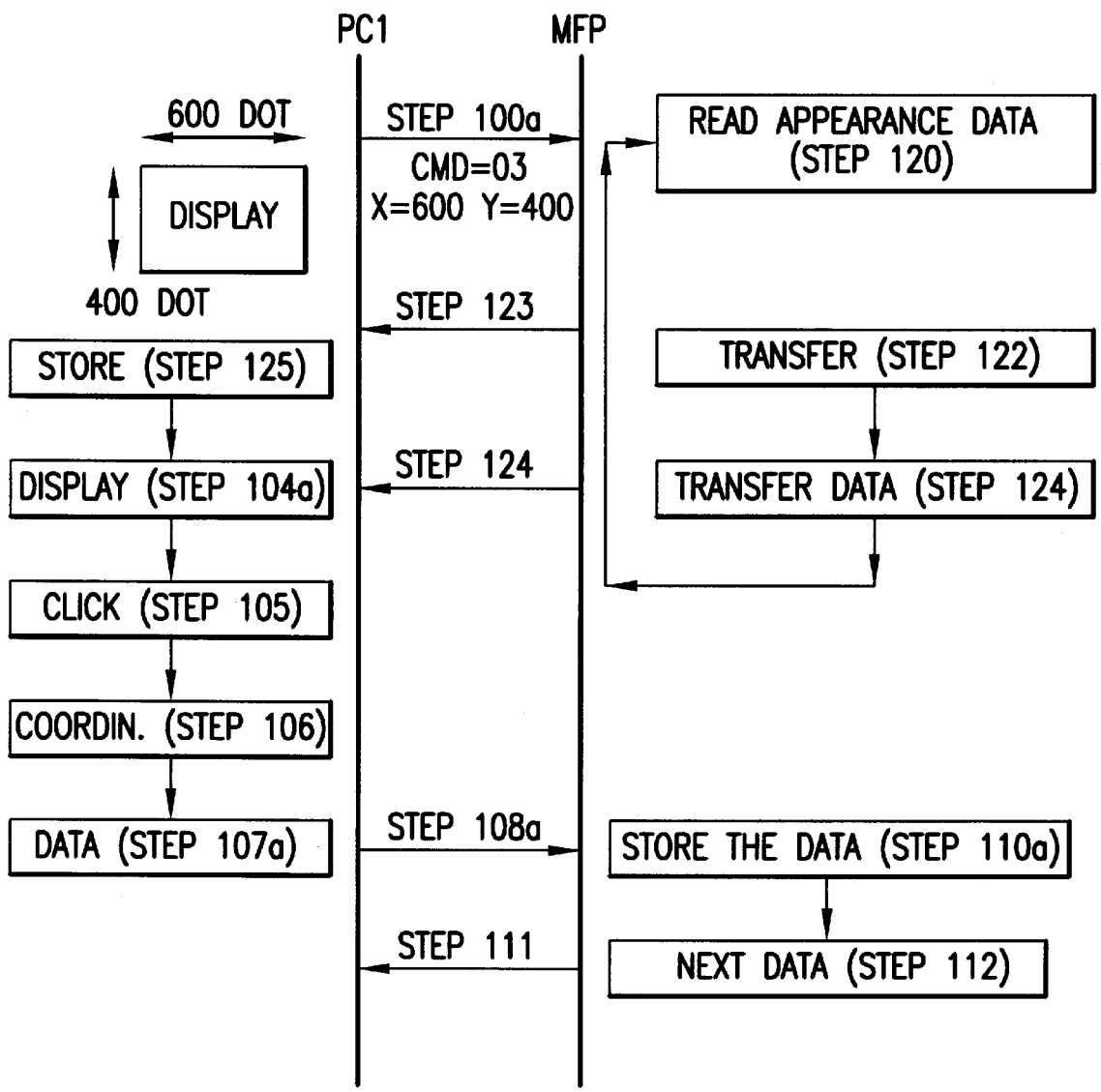
FIG. 18 is a detailed communication sequence of a protocol between the workstation and the copying machine with regard to steps 5 to 7 in FIG. 6, in which the device information format is used.
Figure 19:
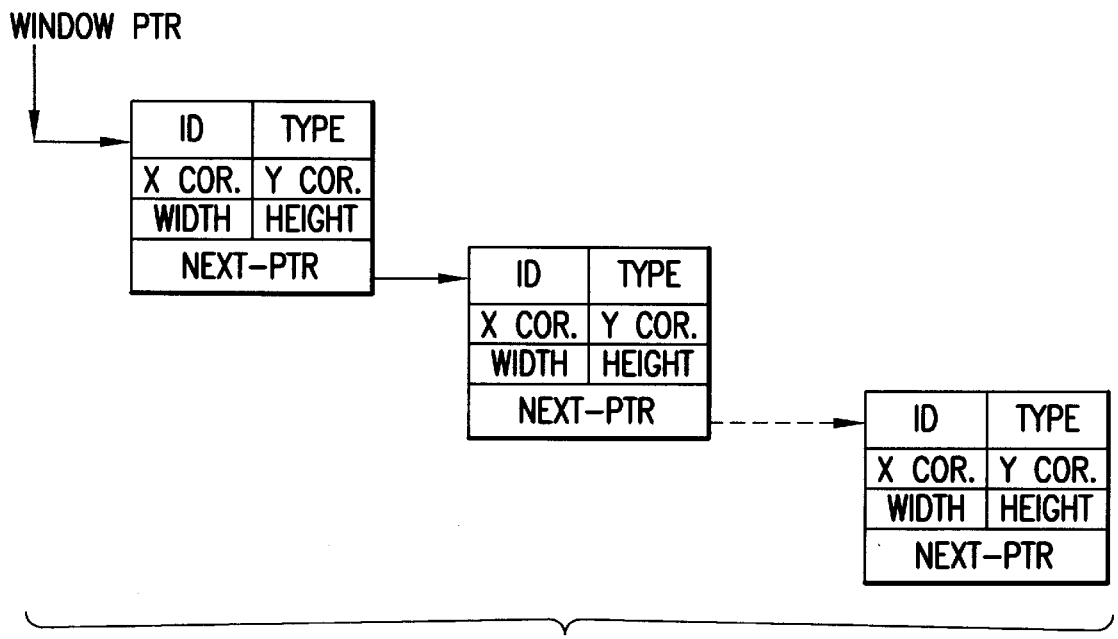
FIG. 19 is an illustration of the data structure for the button appearance information written in the device information format.
Figure 20:
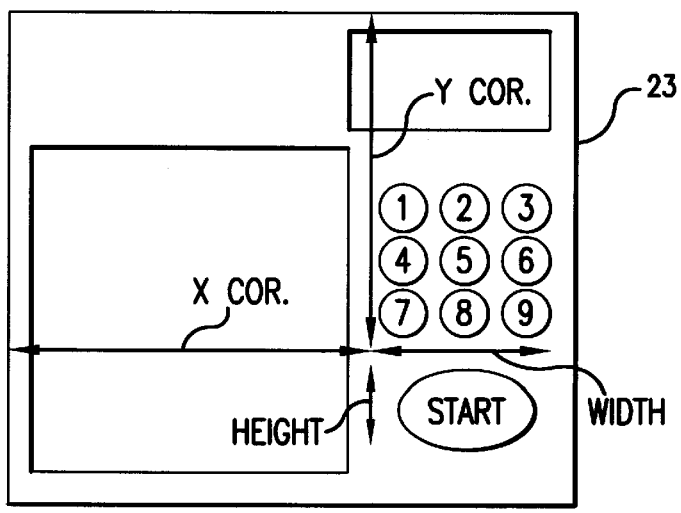
FIG. 20 is an illustration of a screen image for the button appearance, which may be displayed by the workstation.

FIG. 18 shows the details of the communication sequence of a protocol between the client and server with regard to steps 5 to 7 in the FIG. 6, in which the device information format is used. In FIG. 18, steps that serve the same purpose as steps in FIG. 14 are given the same reference numerals, and descriptions thereof will be omitted. In this example, the information for the buttons of the operation panel is transferred from the server to client one by one. FIG. 19 is an illustration of the data structure of the button information. This data comprises "ID", "TYPE", "X Cor", "Y Cor", "WIDTH", and "HEIGHT" ("ID" is the identification for each data). "TYPE" means the shape of the button, such as a circle or square. "X Cor" is the X axis coordinate of the button. "Y Cor" is the Y axis coordinate of the button. "WIDTH" is the width of the button, and "HEIGHT" is the height of the button. "NEXT-prt" means that a next button will be continued, and "O" means that the button is the last one so that it is not necessary to continue. FIG. 20 is one example of the button panel as displayed in display 23.

The client requests the operation panel information from the server with a command code and the client's display size, for example, CMD=03, X=600 dot and Y=400 dot (step 100a). The operation controller 52 of the server reads the information from service information storing device 54 (step 120). If there is information for the button, then it continues (step 121). The information is transferred to the client via communication controller 55 (step 122). The raster data corresponding to the "TYPE" data is transferred from the server to the client (step 124), if the client does not have the raster data in advance. If the client already has the raster data or stored the last raster data, the raster data does not need to be transferred. The information is stored in memory 22 (step 125) and displayed via display controller 25 on display device 23 (step 104a). The user recognizes the structure of the server or copying machine in the displayed picture of the appearance information. The user can move pointer 60 to any position within screen image and click the mouse on the object the user wants to select, for example, "horizontal" (step 105). Next, the client gets the coordinates (x, y) of the selected object corresponding to pointer 60 (step 106). The "ID" data corresponding to the selected object (step 107a) is transferred from the client to the server via the communication device 26 (step 108a). After the server receives the coordinates, operation controller 52 of the server stores it (step 110a). The server transfers an "OK" signal to the client (step 111) and starts to transfer data for the next button. The above steps are repeated until all of the button information is transferred to the client.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters: Patent of the United States is:

1. A print manager system for controlling printing of print jobs in a network, comprising:
    at least one copying machine, including a means for storing appearance data of the copying machine, and a means for transferring the appearance data, and
    at least one terminal being connected to the copying machine, including a display device for displaying the appearance data transferred from the copying machine,
    wherein when the terminal requests the appearance data from the copying machine, the copying machine transfers the appearance data to the terminal so that the terminal does not have to store the appearance data locally, and the appearance data comprises a graphical image of the copying machine.

2. The system of claim 1, in which the appearance data of the copying machine includes a picture of an appearance of the copying machine.

3. The system of claim 2, in which the appearance data of the copying machine is in a raster data format.

4. The system of claim 2, in which the appearance data of the copying machine is in a graphics command data format.

5. The system of claim 2, in which the appearance data of the copying machine is in a device information format.

6. The system of claim 1, in which the appearance data of the copying machine includes a picture of an appearance of the copying machine, and a picture of an operation panel of the copying machine.

7. The system of claim 1, in which the appearance data of the copying machine includes a picture of an appearance of the copying machine, a picture of an operation panel of the copying machine, and one of specifications and status information of each device of the copying machine.

8. The system of claim 7, in which the copying machine comprises a copier function, a facsimile function, a printer function, and a scanner function.

9. The system of claim 1, in which the terminal comprises a pointing device for pointing to a part of a displayed image on the display device.

10. The system of claim 9, in which the terminal comprises a communication device for transferring coordinate numerical data corresponding to the part of the displayed image pointed to by the pointing device.

11. A print managing process for controlling printing of print jobs in a network including at least one copying machine and at least one terminal, comprising the steps of:
    a) at said terminal, requesting the copying machine to transmit an image of an appearance of the copying machine;
    b) at said copying machine, transferring the image to the terminal so that the terminal does not have to store the image locally;
    c) at said terminal, displaying the image on a display device, and transferring a part of the displayed image pointed to by a pointing device to the copying machine; and
    d) at said copying machine, transferring detailed information as to the part of the displayed image pointed to by the pointing device.

12. A print managing process for controlling printing of print jobs in a network including at least one copying machine and at least one terminal, comprising the steps of:
    a) at said terminal, requesting the copying machine to transmit an image of an appearance of the copying machine;
    b) at said copying machine, transferring the image to the terminal so that the terminal does not have to store the image locally;
    c) at said terminal, displaying the image on a display device, and transferring coordinate numerical data corresponding to a part of the displayed image pointed to by a pointing device; and
    d) at said copying machine, receiving the coordinate numerical data, and transferring detailed information as to the part of the displayed image pointed to by the pointing device.

13. A print managing process for controlling printing of print jobs in a network including at least one copying machine, at least one terminal, and an object request broker for interfacing between the copying machine and the terminal and for selecting a best available copying machine for the terminal, comprising the steps of:
    a) at said terminal, providing a request for selecting the best available copying machine;
    b) at the object request broker, selecting the best available copying machine, and connecting the best available copying machine to the terminal;
    c) at said terminal, requesting the copying machine to transmit an image of an appearance of the copying machine;
    d) at said copying machine, transferring the image to the terminal;
    e) at said terminal, displaying the image on a display device, and transferring numerical coordinate data corresponding to a part of the displayed image pointed to by a pointing device; and
    f) at said copying machine, transferring detailed information as to the part of the displayed image pointed to by the pointing device.

14. A print managing process for controlling printing of print jobs in a network including at least one copying machine, at least one terminal, and an object request broker for interfacing between the copying machine and the terminal and for selecting a best available copying machine for the terminal, comprising the steps of:

a) at said terminal, providing a request to the object request broker to select the best available copying machine;

b) at the object request broker, selecting the best available copying machine, and connecting the best available copying machine to the terminal;

c) at said terminal, requesting the copying machine to transmit an image of an appearance of the copying machine;

d) at said copying machine, transferring the image to the terminal;

e) at said terminal, displaying the image on a display device, and transferring coordinate numerical data corresponding to a part of the displayed image pointed to by a pointing device; and f) at said copying machine, receiving the coordinate numerical data, and transferring detailed information as to the part of the displayed image pointed to by the pointing device.

15. A print manager system for controlling printing of print jobs in a network, comprising:

at least one copying machine, including a means for storing a graphical image of the copying machine, and a means for transferring the graphical image of the copying machine; and at least one terminal being connected to the copying machine, including a display device for displaying the graphical image of the copying machine transferred from the copying machine;

wherein when the terminal requests the graphical image of the copying machine from the copying machine, the copying machine transfers the graphical image of the copying machine to the terminal so that the terminal does not have to store the graphical image of the copying machine locally.

16. The system of claim 15, wherein the graphical image of the copying machine comprises one of a graphical image of an appearance of the copying machine and a graphical image of an operation panel of the copying machine.

17. A print managing process for controlling printing of print jobs in a network including at least one copying machine and at least one terminal, comprising the steps of:

a) at said terminal, requesting the copying machine to transmit a graphical image of the copying machine;

b) at said copying machine, transferring the graphical image of the copying machine to the terminal so that the terminal does not have to store the graphical image of the copying machine locally;

c) at said terminal, displaying the graphical image of the copying machine on a display device, and transferring coordinates of a part of the displayed graphical image of the copying machine pointed to by a pointing device to the copying machine; and d) at said copying machine, transferring detailed information as to the part of the displayed graphical image of the copying machine pointed to by the pointing device.

* * * * *